United States Patent
Poster

(10) Patent No.: US 11,619,295 B2
(45) Date of Patent: Apr. 4, 2023

(54) BYPASS BLOCK FOR UNREGULATED GEARBOXES

(71) Applicant: TEXTRON INNOVATIONS INC., Providence, RI (US)

(72) Inventor: Scott David Poster, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/512,974

(22) Filed: Oct. 28, 2021

(65) Prior Publication Data

US 2022/0074485 A1    Mar. 10, 2022

Related U.S. Application Data

(62) Division of application No. 15/967,884, filed on May 1, 2018, now Pat. No. 11,209,079.

(51) Int. Cl.
*F16H 57/04* (2010.01)
*B64C 27/12* (2006.01)

(52) U.S. Cl.
CPC ..... *F16H 57/0435* (2013.01); *F16H 57/0404* (2013.01); *F16H 57/0421* (2013.01); *B64C 27/12* (2013.01)

(58) Field of Classification Search
CPC ............. F16H 57/0435; F16H 57/0404; F16H 57/0421; B64C 27/12
See application file for complete search history.

(56) References Cited

U.S. PATENT DOCUMENTS

| | | | | |
|---|---|---|---|---|
| 2,970,440 | A * | 2/1961 | Dmitroff | B64C 27/12 60/415 |
| 3,993,561 | A * | 11/1976 | Swearingen | B01D 35/147 210/446 |
| 4,166,792 | A * | 9/1979 | Offer | B01D 35/147 210/446 |
| 4,268,384 | A * | 5/1981 | Rosaen | B01D 27/08 210/DIG. 17 |

(Continued)

FOREIGN PATENT DOCUMENTS

| | | |
|---|---|---|
| DE | 102016212591 A1 | 1/2018 |
| EP | 3564558 A1 | 11/2019 |

(Continued)

OTHER PUBLICATIONS

European Patent Office, Communication pursuant to Article 94(3) EPC for EP Appl. No. 18181818.8 dated Jan. 31, 2022, 6 pp.

(Continued)

*Primary Examiner* — Michael A Riegelman
(74) *Attorney, Agent, or Firm* — Edwin S. Flores; Daniel J. Chalker; Chalker Flores, LLP

(57) ABSTRACT

A bypass apparatus for lubricant in an unregulated pressurized gearbox including: a block including a lubricant inlet in fluid communication with a pressure relief valve, wherein the pressure relief valve diverts lubricant into the gearbox or into an oil filter, wherein lubricant is returned to the gearbox when the lubricant is cold and/or pressure at the pressure relief valve is high to reduce damage to the gearbox caused by high pressure during a cold start, and when the lubricant temperature increases and the pressure is reduced the pressure relief valve closes and lubricant enters the oil filter.

12 Claims, 5 Drawing Sheets

(56) References Cited

U.S. PATENT DOCUMENTS

| | | | | |
|---|---|---|---|---|
| 5,578,221 | A * | 11/1996 | Janik | B01D 36/003 123/198 C |
| 6,058,694 | A * | 5/2000 | Ackerman | F16N 29/02 60/39.08 |
| 6,423,215 | B1 * | 7/2002 | Stein | B01D 35/147 210/90 |
| 8,715,493 | B2 * | 5/2014 | Volkmer | F02M 37/36 210/132 |
| 8,752,673 | B2 * | 6/2014 | Thivierge | F16H 57/0406 184/6.21 |
| 9,238,975 | B2 * | 1/2016 | Detry | F16K 17/046 |
| 2002/0074419 | A1 * | 6/2002 | Duffer | B01D 35/18 239/397.5 |
| 2003/0127384 | A1 * | 7/2003 | Kapur | B01D 35/147 210/416.5 |
| 2005/0029171 | A1 * | 2/2005 | Evanovich | B01D 35/02 210/167.01 |
| 2013/0327689 | A1 * | 12/2013 | Figura | F15B 1/26 210/132 |
| 2016/0341298 | A1 * | 11/2016 | Pekarsky | F16H 57/0404 |
| 2019/0338845 | A1 * | 11/2019 | Poster | F16H 57/0404 |
| 2020/0124162 | A1 * | 4/2020 | Fujii | F16H 57/0423 |
| 2020/0247535 | A1 * | 8/2020 | Acee | B64D 33/08 |

FOREIGN PATENT DOCUMENTS

| | | |
|---|---|---|
| GB | 2141354 A | 12/1984 |
| GB | 2164395 A | 3/1986 |
| JP | 406035607 | 5/1994 |

OTHER PUBLICATIONS

Bell Helicopter, Flight International "Bell 525 Relentless" Nov. 12, 2014.

European Patent Office, Communication pursuant to Article 94(3) EPC for EP Appl No. 18181818.8 dated Dec. 15, 2020, 5 pp.

European Patent Office, Communication pursuant to Article 94(3) EPC for EP Appl No. 18181818.8 dated Jul. 7, 2020, 6 pp.

European Patent Office, Communication pursuant to Article 94(3) EPC for EP Appl. No. 18181818.8 dated Jun. 15, 2021, 6 pp.

European Patent Office, European Search Report for EP Appl. No. 18181818.8 dated Jan. 8, 2019, 14 pp.

Perry, Dominic "ANALYSIS: Bell 525 Relentless cutaway and technical Description" https://www.flightglobal.com/news/articles/analysis-bell-525-relentless-cutaway-and-technical-4055411, Source: Bell Helicopter, Flight International, London, Nov. 12, 2014, 8 pp.

* cited by examiner

BYPASS BLOCK FOR UNREGULATED GEARBOXES

CROSS-REFERENCE TO RELATED APPLICATIONS

This application claims priority to and is a divisional patent application of U.S. patent application Ser. No. 15/967,884 filed on May 1, 2018, which is hereby incorporated by reference in its entirety.

This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which is hereby incorporated by reference in its entirety.

STATEMENT OF FEDERALLY FUNDED RESEARCH

None.

TECHNICAL FIELD OF THE INVENTION

The present invention relates in general to the field of gearboxes, and more particularly, to a method of installing a pressure relief or bypass valve in a previously unregulated pressurized gearbox or a newly designed pressurized gearbox.

BACKGROUND OF THE INVENTION

Without limiting the scope of the invention, its background is described in connection with gearboxes.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

One such system is taught in U.S. Pat. No. 8,752,673, issued to Thivierge, et al., and entitled "Lubrication system with porous element." These inventors are said to teach a lubrication system for a gas turbine engine that includes at least one porous element located in a cavity containing at least one rotating component receiving a flow of the lubricant, the porous element being located across a path taken by a portion of the lubricant expelled from the at least one respective rotating component such that the portion of the lubricant circulates therethrough, the at least one porous element being made of a material resistant to a temperature of the lubricant, and the at least one porous element reducing a velocity of the portion of the lubricant circulating therethrough.

Another such system is taught in U.S. Pat. No. 6,058,694, issued to Ackerman, et al., and entitled "Gas turbine engine commanded oil flow valve with failsafe." These inventors are said to teach an improved oil flow reduction valve regulates the flow of lubricant to a fan reduction gearbox of a turbine engine, or other accessories requiring lubrication as a function of engine load. The invention is said to take advantage of the strong correlation between the gear torque output of the engine and the engine compressor discharge pressure by metering oil flow as a function of compressor discharge pressure. In one embodiment a metering valve employs a sense piston that receives a pressure signal from the compressor section of the engine. In response to the pressure signal, the sense piston moves a slide valve, which blocks or uncovers one or more output orifices to regulate the flow of oil through the metering valve. The valve is preferably configured to allow maximum oil flow in the event the valve should fail or in the event the compressor discharge pressure signal is lost, to ensure safe operation of the lubricated components.

The drawbacks of prior art gear lubrication systems, make systems and methods of improving the reliability of pressurized gearboxes desirable.

SUMMARY OF THE INVENTION

In one embodiment, the present invention includes a bypass apparatus for lubricant in an unregulated pressurized gearbox including: a block including a lubricant inlet in fluid communication with a relief valve, wherein the relief valve diverts lubricant at high pressure into the gearbox or at low pressure into an oil filter, wherein lubricant is returned to the gearbox when the lubricant is cold and pressure at the relief valve is high to reduce damage to the gearbox or the oil filter caused by high pressure during a cold start, and when the lubricant temperature increases and the pressure is reduced the relief valve closes and lubricant enters the oil filter. In one aspect, the bypass block is upstream from an oil filter. In another aspect, the relief valve is a pressure relief valve and relieves pressure down to 250 psi or any preset value. In another aspect, the gearbox is an intermediate gearbox, a tail rotor gearbox, or a reduction gearbox. In another aspect, the relief valve is at least one of: mechanical, electronic, magnetic, or spring-loaded. In another aspect, the relief valve is a pressure or temperature activated valve. In another aspect, the relief valve is a pressure relief valve. In another aspect, the relief valve is both activated by pressure and temperature. In another aspect, the relief valve is a pressure relief valve, a pressure release valve, a pressure safety valve, a safety relief valve, a pilot-operated relief valve, a snap acting release valve, a pop-it valve, or a modulating release valve.

In another embodiment, the present invention includes a method for reducing lubricant damage to an unregulated gearbox including: providing a block including a lubricant inlet in fluid communication with a relief valve, wherein the relief valve diverts lubricant into the gearbox or into an oil filter; diverting the lubricant into the gearbox when the lubricant is cold and pressure at the relief valve is high to reduce damage to the gearbox or the oil filter caused by high pressure during a cold start, and closing the relief valve when the lubricant temperature increases and the pressure is reduced the relief valve closes and lubricant enters the oil filter. In one aspect, the bypass block is upstream from an oil filter. In another aspect, the relief valve is a pressure relief valve and relieves pressure down to 250 psi or any preset value. In another aspect, the gearbox is an intermediate gearbox, a tail rotor gearbox, or a reduction gearbox. In another aspect, the relief valve is at least one of: mechanical, electronic, magnetic, or spring-loaded. In another aspect, the relief valve is a pressure or temperature activated valve. In another aspect, the relief valve is a pressure relief valve. In another aspect, the relief valve is both activated by pressure and temperature. In another aspect, the relief valve is a pressure relief valve, a pressure release valve, a pressure safety valve, a safety relief valve, a pilot-operated relief valve, a snap acting release valve, a pop-it valve, or a modulating release valve.

In another embodiment, the present invention includes a bypass apparatus for lubricant in an unregulated gearbox including: a block including a lubricant inlet in fluid communication with a pressure relief valve, wherein the pressure relief valve diverts lubricant into the gearbox or into an oil filter, wherein lubricant is returned to the gearbox when the lubricant is cold and pressure at the pressure relief valve is high to reduce damage to the gearbox caused by high pressure during a cold start, and when the lubricant temperature increases and the pressure is reduced the pressure relief valve closes and lubricant enters the oil filter.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention relates to a lubrication fluid bypass for pressurized but unregulated gearboxes. More specifically, the present invention addresses the need for optimizing lubrication fluid flow during various stages of operation of a gearbox. One such example of a gearbox is an intermediate gearbox of a rotorcraft. Generally, gearboxes are separated into those that are splash lubricated gearboxes, where no oil pressure is present, and those that are pressurized and in which the fluid flow is controlled throughout the gearbox. The present invention uses a bypass block, described in further detail hereinbelow, to limit the pressure within the pressurized gearbox during cold starts and other conditions that may result in excess pressure. During a cold start, that is when the lubrication fluid has not warmed and during which it is at a maximum viscosity, pressure can damage the gearbox do to the extreme high pressure created as a result of attempting to flow a very viscous fluid through a lubrication pump and into the oil filter. The high pressure during cold start-up leads to reduce life for the lubrication pump, the oil filter, and/or the gearbox and can also lead to higher component design requirements due to the excess pressures encountered.

Figure 1:
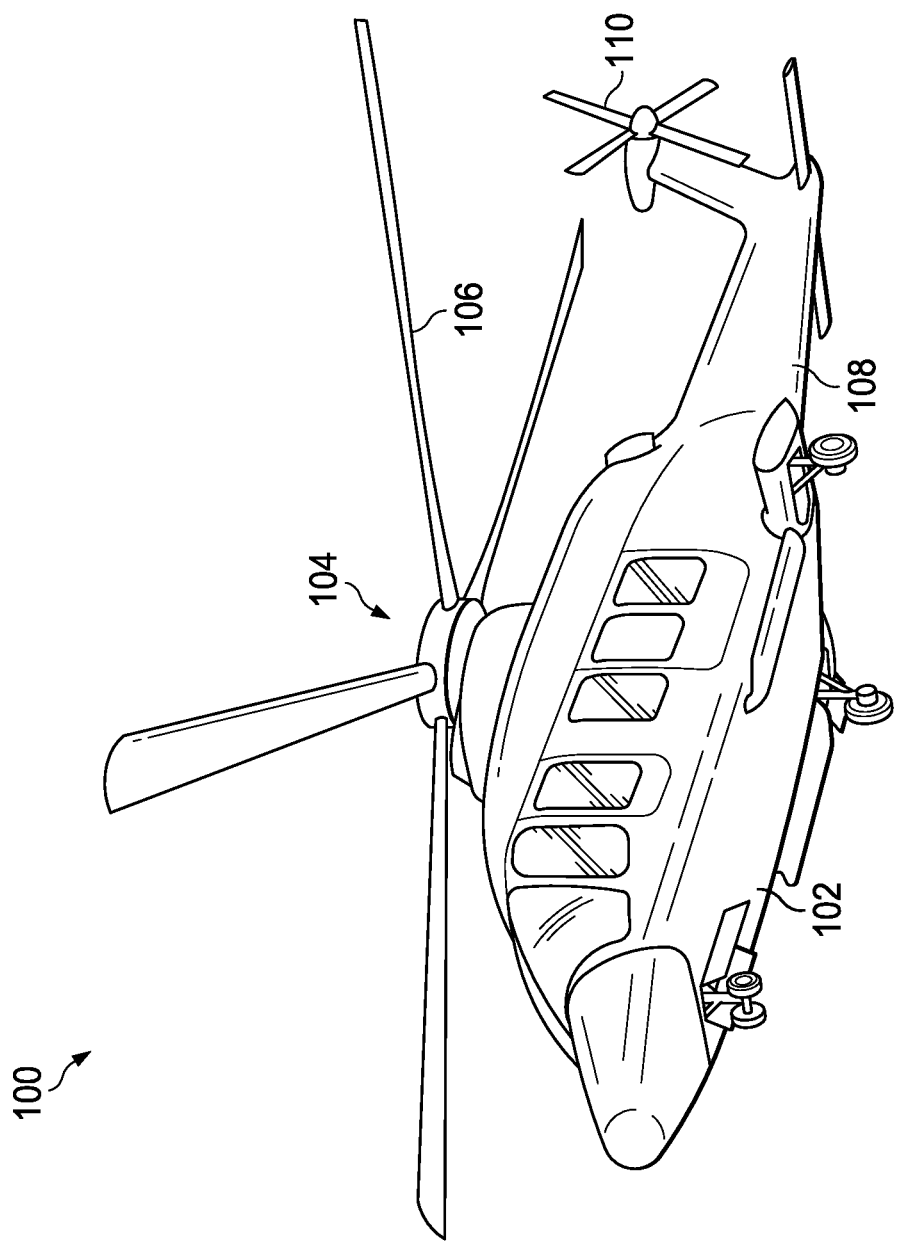
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
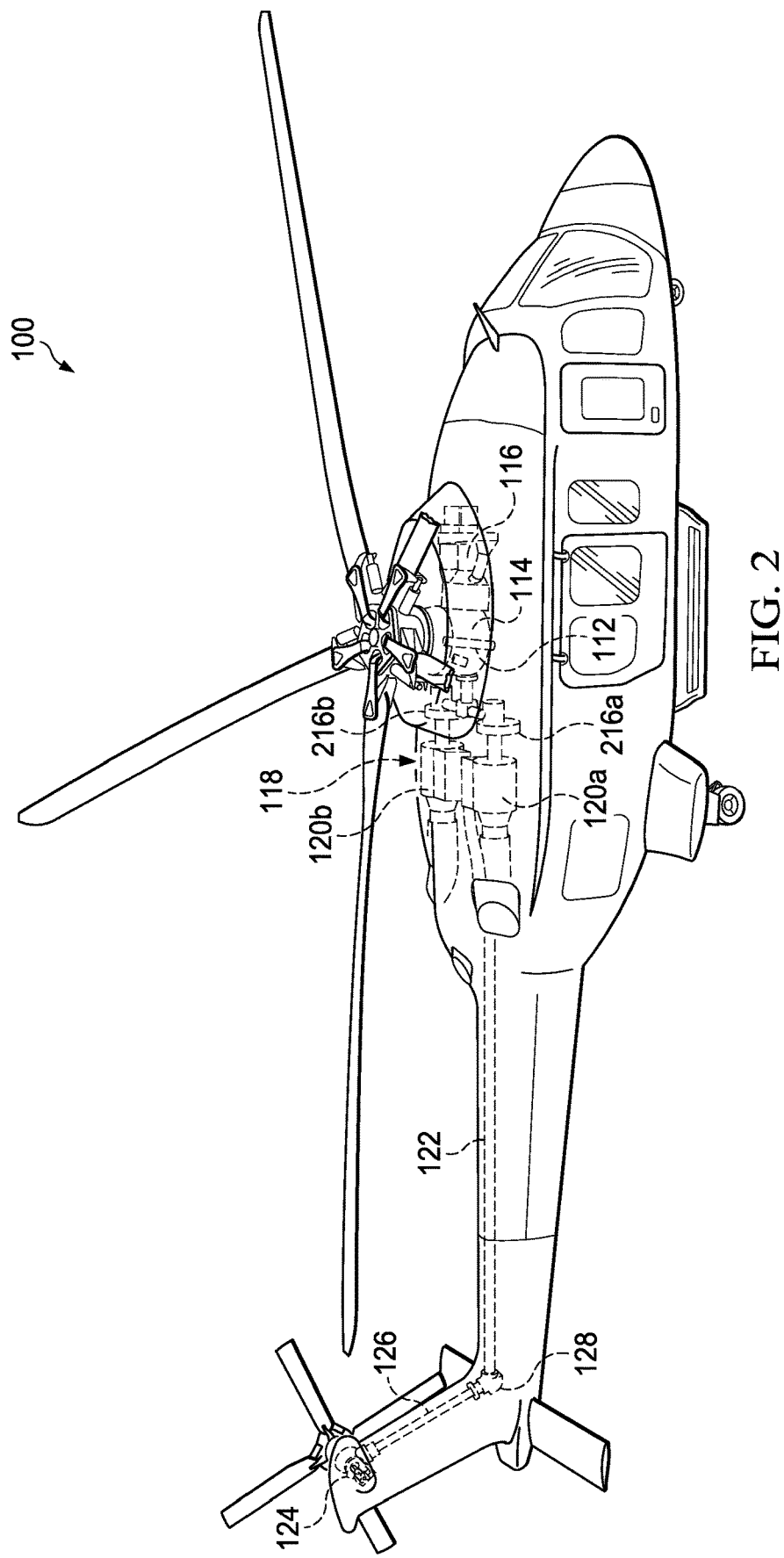
FIG. 2 shows a partial cross-section, perspective view of helicopter aircraft according to an alternative embodiment of the present application.

For example, FIG. 2 shows a partial cross-section perspective view of aircraft 100 that includes additional detail of the present invention. Aircraft 100 further includes a main rotor mast 112, which is connected to the main rotor gearbox (MRGB) 114. The MRGB 114 is connected to one or more accessory gear boxes 116, one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

The drive system and subcomponents of aircraft 100 were developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

The drive system and subcomponents of aircraft 100 overcome many drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

High-speed gearing and the associated heat generation is always an area of concern for gearbox survivability. The ability to continue torque transmission, particularly in a loss of lubrication scenario, is of great importance. For this reason, the drive system includes two separate RGB's, each one connected to a separate engine and independent from the MRGB. The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM prior to transmitting torque to the MRGB. Each RGB has its own self-contained lubrication system consisting of pump, filter, oil monitoring sensors, and a unique core in the aircraft cooler assembly. With this drive system arrangement high-speed gearing is contained in separate gearboxes, as such, the survivability of the total drive system is greatly enhanced, particularly in the event of high-speed gear failure or loss of lubricant in an individual RGB. The use of independent RGBs that connect to a single low speed overhung planetary gear system in the MRGB reduces rotating part count and heat generation. With maintenance in mind, the drive system allows for a short mast top case assembly that allows swapping of the top case and mast without removal of the main rotor gearbox from the aircraft. The MRGB also includes a clutch for each of the reduction gearboxes that allows each reduction gearbox to be separately and independently disconnected from the MRGB.

The drive system of aircraft 100 can also take advantage of a number of additional features that minimize the possibility of loss of lubricant and to maximize the operational time if a loss of lubricant event does occur. For example, the drive system can also include one or more of the following: (1) the use of transfer tubes for cooler and filter mounting to eliminate the loss of lubricant in the event of loss of attachment fastener torque; (2) using an oil cooler mounted directly to the MRGB eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation in the event of a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

Figure 3:
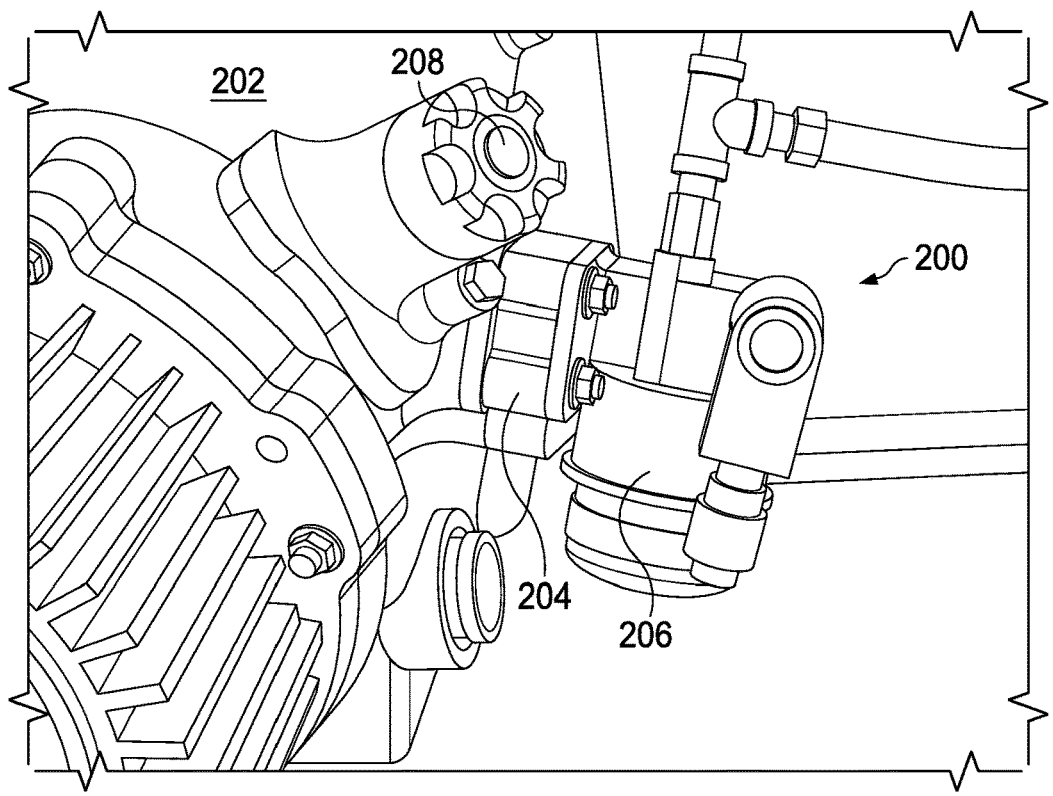
FIG. 3 shows an isometric view of a gearbox lubrication system that shows the position of the bypass block of the present invention.

FIG. 3 shows an isometric view of a gearbox lubrication system 200 that shows the position of the pressure relief bypass block 204 of the present invention. More particularly, the gearbox 202 includes the pressure relief bypass block 204 on the gearbox 202, in relation to an oil filter 206 and the oil cap 208.

Figure 4:
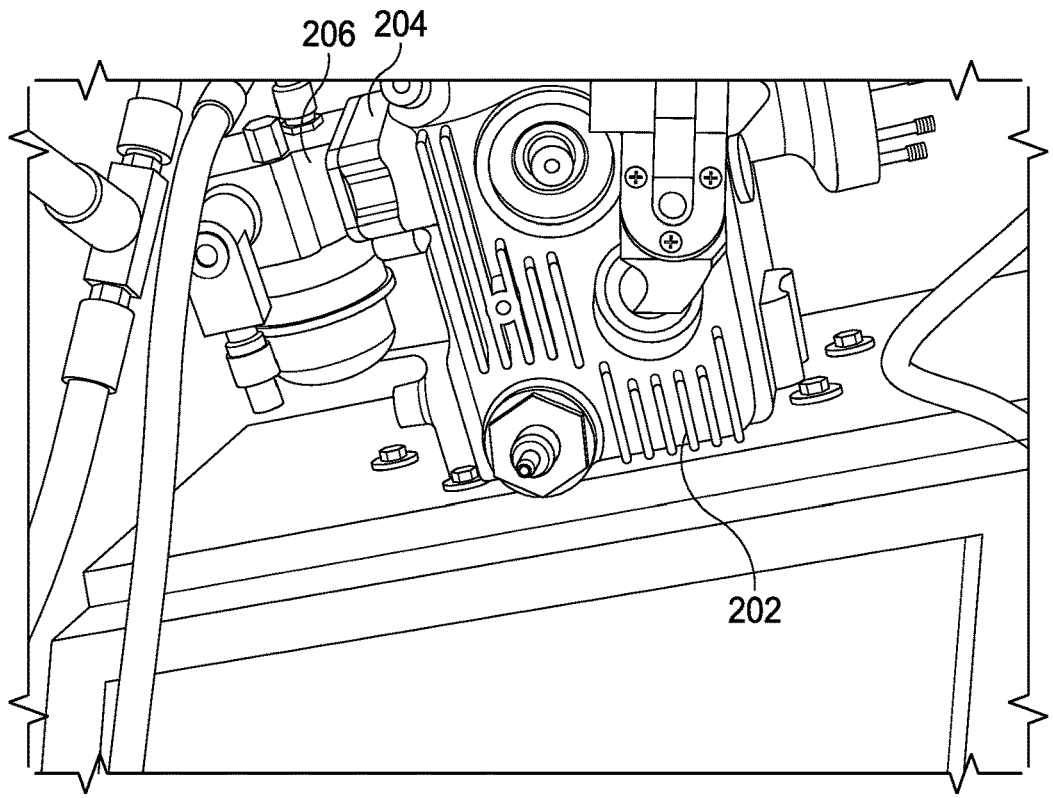
FIG. 4 shows a contralateral isometric view of the gearbox lubrication system that shows the position of the bypass block of the present invention.

FIG. 4 shows a contralateral isometric view of the gearbox lubrication system that shows the position of the pressure relief bypass block 204 of the present invention. More particularly, the gearbox 202 includes the bypass block 204 on the gearbox 202, in relation to an oil filter 206.

Figure 5:
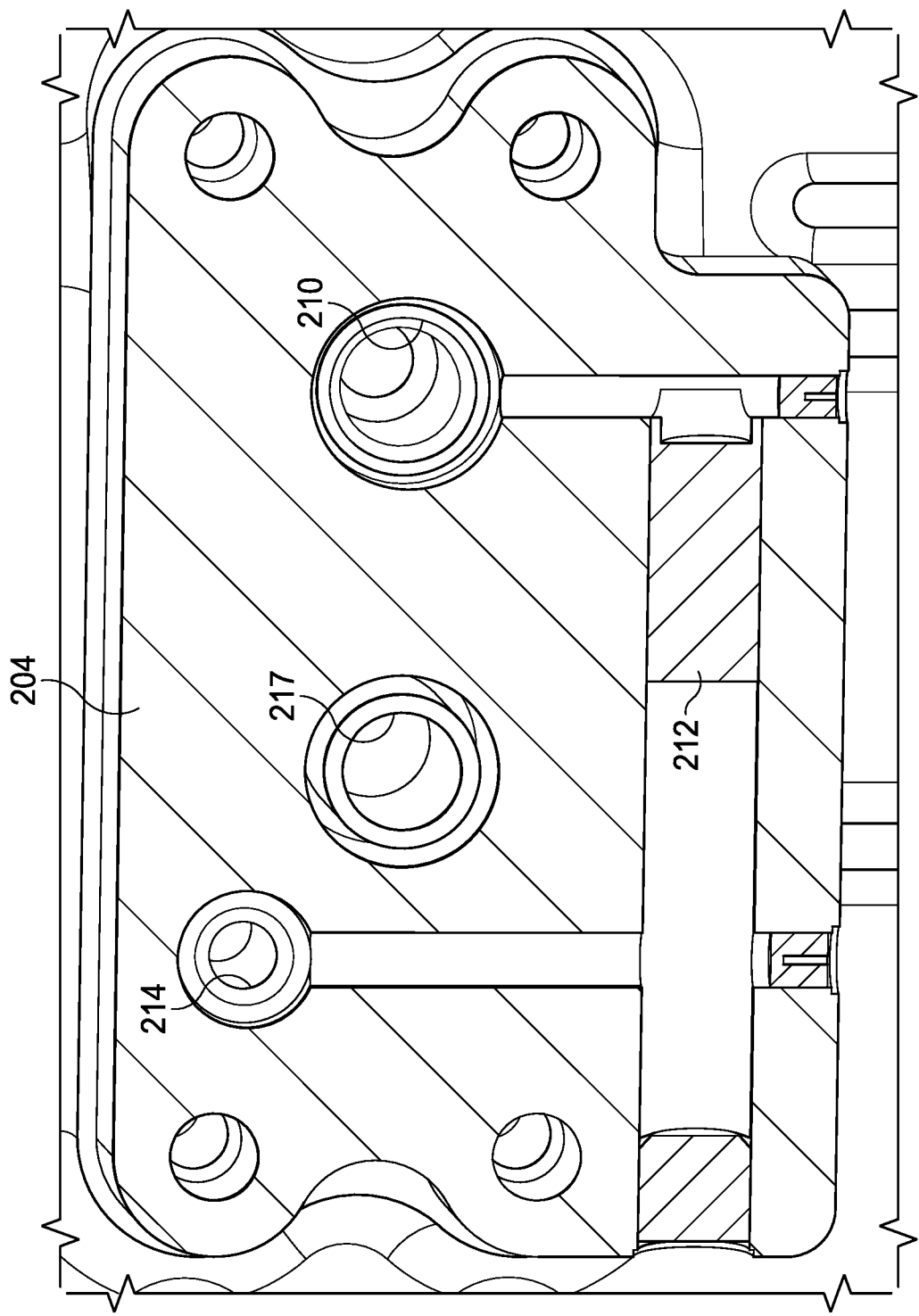
FIG. 5 shows a cross-section view of the bypass block of the present invention.

FIG. 5 shows a cross-section view of the bypass block 204 of the present invention. The pressure relief bypass block 204 includes an inlet 210 through which the lubrication fluid enters the pressure relief bypass block 204. The inlet is in fluid communication with a pressure-relief valve 212, which opens to relieve excess fluid pressure in the pressure relief bypass block 204 such as from the lubricant entering at a low temperature and high viscosity at bypass outlet 214. The pressure-relief valve 212 can be a mechanical pressure-relief valve, such as a pop-it valve or equivalent, can be electronically or magnetically actuated. The pressure-relief valve 212 is maintained open while pressure is at any pressure greater than the component is designed for. When pressure-relief valve 212 is bypassing, fluid entering the oil filter is limited to the set bypass pressure. This fluid is bypassed from 210, through 212, to exit through 214. When pressure drops, and pressure-relief valve 212 closes, fluid enters filter from 210 and exits lubricant exit 217.

Figure 6A:
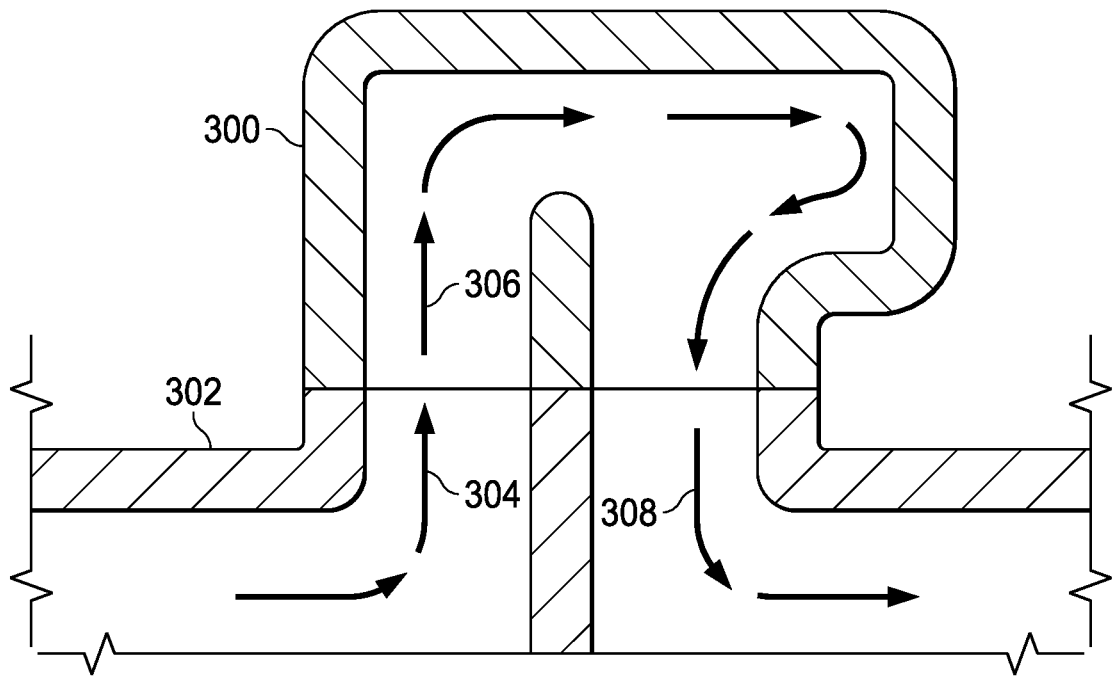
FIG. 6A is a close-up, cross-sectional view of a pressurized filter that is lacking the bypass of the present invention and is connected to gearbox.

FIG. 6A is a close-up, cross-sectional view of a pressurized filter 300 that is lacking the bypass of the present invention and is connected to gearbox 302. The gearbox 302 includes a high pressure lubricating fluid 304 that enters the filter 300 at high pressure 306 and exits the filter, also at high pressure 308.

Figure 6B:
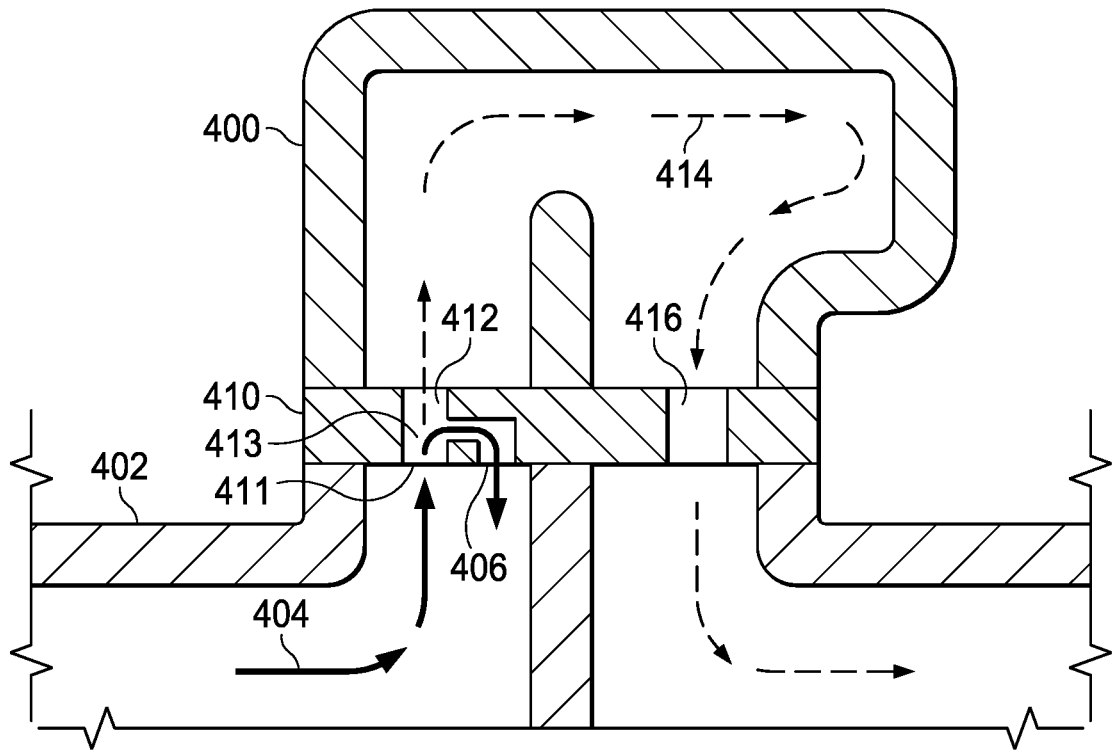
FIG. 6B shows a close-up, cross-sectional view of a pressurized filter that includes a bypass block.

FIG. 6B shows a close-up, cross-sectional view of a pressurized filter 400 that includes a bypass block 410 of the present invention and is connected to the unregulated pressurized gearbox 402. The bypass block 410 is contained within a block, manifold, or housing that is separate from the gearbox housing or filter housing. The bypass block 410 can be provided in the form of a kit that is used to retrofit, and fit with, existing filter and gearbox housing combinations. The bypass block, manifold, or housing kit can include, e.g., gasket(s) and longer screws that account for the added thickness of the bypass block, manifold, or housing. The bypass block 410 may be added to previously designed pressure lubricated gearboxes or in a newly designed pressure lubricated gearbox in which limiting the high pressure is beneficial. High pressure lubricant fluid 404 exits the unregulated pressurized gearbox 402 and enters the bypass block 410 at lubricant inlet 411, and the high pressure lubricating fluid is returned to the unregulated pressurized gearbox 402 through the bypass valve 413 at high pressure at the bypass outlet 406. As the pressure of the lubricating fluid drops, the bypass valve 413 closes and the low pressure lubricating fluid 414 enters the pressurized filter 400 at the low-pressure outlet 412, and exits the pressurized oil filter 400 at the lubricant exit 416. Thus, after the pressure of the lubricating fluid drops in the unregulated pressurized gearbox 402, it does so within the pressurized filter 400, and the low pressure lubricating fluid 414 exits the filter 400 back into the unregulated pressurized gearbox through the lubricant exit 416.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method for reducing lubricant damage to an existing combination of an unregulated pressurized gearbox and a pressurized filter comprising:
providing a bypass block comprising a bypass valve, a lubricant inlet in fluid communication with the bypass valve, a bypass outlet in fluid communication with the bypass valve, a low-pressure outlet in fluid communication with the bypass valve, and a lubricant exit, wherein the bypass block is separate from a housing of the unregulated pressurized gearbox and is attached to the unregulated pressurized gearbox and the pressurized filter such that the bypass valve is upstream from the pressurized filter, the lubricant inlet is in fluid communication with the unregulated pressurized gearbox, the bypass outlet is in fluid communication with the unregulated pressurized gearbox, the low-pressure outlet is in fluid communication with the pressurized filter, and the lubricant exit is in fluid communication with the pressurized filter and the unregulated pressurized gearbox;
diverting a lubricant at temperatures or pressures within predetermined bypass value ranges into the unregulated pressurized gearbox through the bypass outlet to reduce damage to the pressurized filter from high pressure; and allowing the lubricant at temperatures or pressures outside the predetermined bypass value ranges into the pressurized filter through the low-pressure outlet.

2. The method of claim 1, wherein the unregulated pressurized gearbox is an intermediate gearbox, a tail rotor gearbox, or a reduction gearbox.

3. The method of claim 1, wherein the relief valve is at least one of: mechanical, electronic, magnetic, or spring-loaded.

4. The method of claim 1, wherein the relief valve is a pressure or temperature activated valve.

5. The method of claim 1, wherein the relief valve is a pressure relief valve.

6. The method of claim 1, wherein the relief valve is a pressure relief valve, a pressure release valve, a pressure safety valve, a safety relief valve, a pilot-operated relief valve, a snap acting release valve, a pop-it valve, or a modulating release valve.

7. A method for reducing lubricant damage to an existing combination of an unregulated pressurized gearbox and a pressurized filter comprising:

providing a bypass block comprising a bypass valve and a lubricant inlet in fluid communication with the bypass valve, wherein the bypass block is separate from a housing of the unregulated pressurized gearbox and attached to the unregulated pressurized gearbox and the pressurized filter, and the bypass block is upstream from the pressurized filter; and diverting a lubricant into the unregulated pressurized gearbox or into the pressurized filter, wherein the lubricant is returned to the unregulated pressurized gearbox when the lubricant is cold and pressure at the bypass valve is high to reduce damage to the unregulated pressurized gearbox caused by high pressure during a cold start, and when the lubricant temperature increases and the pressure is reduced the valve closes and the lubricant enters the pressurized filter.

8. The method of claim 7, wherein the unregulated pressurized gearbox is an intermediate gearbox, a tail rotor gearbox, or a reduction gearbox.

9. The method of claim 7, wherein the relief valve is at least one of: mechanical, electronic, magnetic, or spring-loaded.

10. The method of claim 7, wherein the relief valve is a pressure or temperature activated valve.

11. The method of claim 7, wherein the relief valve is a pressure relief valve.

12. The method of claim 7, wherein the relief valve is a pressure relief valve, a pressure release valve, a pressure safety valve, a safety relief valve, a pilot-operated relief valve, a snap acting release valve, a pop-it valve, or a modulating release valve.

* * * * *